(12) United States Patent
Routh et al.

(10) Patent No.: US 12,454,836 B2
(45) Date of Patent: Oct. 28, 2025

(54) ALIGNMENT CLAMP AND TIE ROD CONNECTOR ASSEMBLY FOR FORMWORK PANELS

(71) Applicant: PERI SE, Weissenhorn (DE)

(72) Inventors: Anibrata Routh, Mumbai (IN); Arun Kunnathally Somasundaram, Mumbai (IN); Sitarama Rao Naga Venkata Challa, Mumbai (IN); Mahesh Dongare, Mumbai (IN); Ankush Rathod, Mumbai (IN); Vinothkumar Raju, Mumbai (IN)

(73) Assignee: PERI SE, Weissenhorn (DE)

( * ) Notice: Subject to any disclaimer, the term of this patent is extended or adjusted under 35 U.S.C. 154(b) by 933 days.

(21) Appl. No.: 17/609,761

(22) PCT Filed: May 4, 2020

(86) PCT No.: PCT/EP2020/062312
§ 371 (c)(1),
(2) Date: Nov. 8, 2021

(87) PCT Pub. No.: WO2020/225206
PCT Pub. Date: Nov. 12, 2020

(65) Prior Publication Data
US 2022/0235563 A1    Jul. 28, 2022

(30) Foreign Application Priority Data

May 7, 2019    (IN) .............................. 201911018268

(51) Int. Cl.
*E04G 17/06*    (2006.01)
*E04G 9/02*    (2006.01)
(Continued)

(52) U.S. Cl.
CPC ............... *E04G 17/04* (2013.01); *E04G 9/02* (2013.01); *E04G 9/04* (2013.01); *E04G 11/08* (2013.01);
(Continued)

(58) Field of Classification Search
CPC ..... E04G 17/045; E04G 17/04; E04G 17/042; E04G 17/047; E04G 17/07;
(Continued)

(56) References Cited

U.S. PATENT DOCUMENTS 1,350,084 A    8/1920    Schub
1,911,701 A *    5/1933    Lynch ................. E04G 17/0721
249/219.1

(Continued)

FOREIGN PATENT DOCUMENTS

CA    2179084 A1    12/1997
CH    311730 A    12/1955
(Continued)

*Primary Examiner* — Kyle J. Walraed-Sullivan
(74) *Attorney, Agent, or Firm* — SLEMAN & LUND LLP (57) ABSTRACT

An alignment clamp sub-assembly (402) for connecting and aligning a pair of formwork panels (200) with each other is disclosed. The alignment clamp sub-assembly (402) includes a base component (502) to be disposed on a joint between a first formwork panel (200-1) and a second formwork panel (200-2). The base component (502) includes a first slot (504) formed on atop surface, and a second slot (508) formed on a front surface and adapted to receive a tie rod (406) in a lateral direction. The alignment clamp sub-assembly (402) includes a wedge (512) adapted to be received in a vertical direction in the first slot (504). The wedge (512) is inserted to lock the base component (502) on the joint and form the second slot (508) for receiving the tie rod (406).

5 Claims, 10 Drawing Sheets

(51) Int. Cl.
  *E04G 9/04* (2006.01)
  *E04G 11/08* (2006.01)
  *E04G 17/04* (2006.01)
  *F16B 5/06* (2006.01)

(52) U.S. Cl.
  CPC .............. *E04G 17/045* (2013.01); *F16B 5/06* (2013.01); *E04G 2009/028* (2013.01)

(58) Field of Classification Search
  CPC ............ E04G 17/0707; E04G 17/0714; E04G 17/0721; E04G 17/0728; E04G 17/0735; E04G 17/0742; E04G 17/14; E04G 11/12; Y10T 403/7064; F16F 2/14; F16B 2200/40; F16B 2200/406; F16B 5/0621; F16B 5/0642; F16B 5/0664; F16B 2005/0678
  USPC ...................................................... 249/219.2
  See application file for complete search history.

(56) References Cited

U.S. PATENT DOCUMENTS

| | | | | |
|---|---|---|---|---|
| 2,095,714 | A * | 10/1937 | Pinaud | E04G 17/0721 29/520 |
| 2,341,993 | A | 2/1944 | Jennings | |
| 2,433,934 | A * | 1/1948 | Symons | E04G 17/0721 249/46 |
| 2,449,864 | A * | 9/1948 | Symons | E04G 17/0721 249/40 |
| 3,550,898 | A | 12/1970 | Ursini | |
| 3,584,827 | A * | 6/1971 | Shoemaker | E04G 17/047 249/219.2 |
| 3,584,829 | A * | 6/1971 | Shoemaker | E04G 11/12 249/219.2 |
| 3,655,162 | A * | 4/1972 | Shoemaker | E04G 17/07 D25/199 |
| 3,712,576 | A | 1/1973 | Dagiel | |
| 3,724,806 | A * | 4/1973 | Shoemaker | E04G 17/07 249/219.2 |
| 3,933,332 | A * | 1/1976 | Lovisa | E04G 17/0714 249/43 |
| 3,945,602 | A * | 3/1976 | Doubleday | E04G 17/047 249/44 |
| 4,508,310 | A * | 4/1985 | Schultz | E04G 17/02 249/189 |
| 5,039,059 | A | 8/1991 | Miller | |
| 5,160,640 | A | 11/1992 | Badstieber | |
| 5,265,973 | A * | 11/1993 | Badstieber | E04G 17/045 403/387 |
| 5,562,845 | A * | 10/1996 | Miller | E04G 17/042 249/219.1 |
| 6,322,047 | B1 * | 11/2001 | Holmboe, Jr. | E04G 17/14 249/47 |
| 8,042,786 | B2 | 10/2011 | Spindler | |
| 2002/0100857 | A1 | 8/2002 | Gallis | |
| 2004/0079860 | A1 | 4/2004 | Ward | |
| 2006/0255236 | A1 * | 11/2006 | Shidler | E04G 11/12 249/219.2 |
| 2008/0017783 | A1 * | 1/2008 | Vanagan | E04G 17/045 249/192 |
| 2009/0230283 | A1 * | 9/2009 | Brewka | E04G 17/045 249/191 |
| 2015/0204086 | A1 * | 7/2015 | Klehr | E04G 17/045 425/63 |
| 2015/0308131 | A1 * | 10/2015 | Grzondziel | E04G 17/04 403/374.2 |
| 2016/0319558 | A1 | 11/2016 | Lee | |
| 2017/0145703 | A1 * | 5/2017 | Liu | B28B 7/0014 |

FOREIGN PATENT DOCUMENTS

| | | |
|---|---|---|
| CN | 201037314 Y | 3/2008 |
| CN | 201756793 U | 3/2011 |
| CN | 202706551 U | 1/2013 |
| CN | 106193584 A | 12/2016 |
| CN | 208202569 U | 12/2018 |
| DE | 3004395 A1 | 8/1981 |
| DE | 3604252 A1 | 8/1987 |
| DE | 202015006634 U1 | 11/2015 |
| EP | 3144450 A1 | 3/2017 |
| FR | 2429885 A1 | 1/1980 |
| FR | 2484508 A1 | 12/1981 |
| FR | 2607536 A1 | 6/1988 |
| GB | 811383 A | 4/1959 |
| GB | 930579 A | 7/1963 |
| JP | H068601 U | 2/1994 |
| JP | 2000009117 A | 1/2000 |
| JP | 2004156281 A | 6/2004 |
| JP | 2007154504 A | 6/2007 |
| KR | 100860359 B1 | 9/2008 |
| KR | 20080085676 A | 9/2008 |
| KR | 20120067074 A | 6/2012 |
| WO | 03052217 A1 | 6/2003 |
| WO | 2003052217 A1 | 6/2003 |
| WO | 2005042877 A1 | 5/2005 |

\* cited by examiner

ALIGNMENT CLAMP AND TIE ROD CONNECTOR ASSEMBLY FOR FORMWORK PANELS

FIELD OF THE INVENTION

The present disclosure relates to construction industry and more particularly, relates to a connector assembly adapted to connect and align a pair of formwork panels with each other.

BACKGROUND

In the construction industry, wall forms or panels are generally used as supporting components to form structures, such as columns and walls. Such panels are usually made of wood having a metal frame or made entirely of metal. Based on dimensions and shape of a structure to be formed, multiple panels are installed at a construction site to form a hollow space which would correspond to the dimensions and shape of the structure. In order to form the hollow space, the panels are basically connected to each other by using various connecting mechanisms, such as pins and latches. For example, in case of forming a column, multiple panels may be connected to each other to form a hollow space in between. Thereafter, concrete or any other material may be poured from the top in the hollow space, which would then settle in to take a targeted shape of the column, by the virtue of the dimensions of the hollow space. Over a period of time, the concrete dries out and the panels are then removed to obtain the column so formed.

In case of construction of larger structures, multiple panels are to be connected to each other. Any error in the connection of these panels may lead to falling of the panels causing damage at the construction site. The alignment of these panels with each other is equally critical as any error in the alignment would hamper an overall quality of the structure to be formed.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

In an embodiment of the present disclosure, a connector assembly for connecting and aligning a pair of formwork panels with each other is disclosed. The connector assembly includes an alignment clamp sub-assembly adapted to be mounted on a joint between a first formwork panel and a second formwork panel. The alignment clamp sub-assembly includes a base component to be disposed on the joint. The base component includes a first slot adapted to receive a wedge in a vertical direction and a second slot adapted to receive a tie rod in a lateral direction. The connector assembly includes a tie rod sub-assembly adapted to be disposed on the alignment clamp sub-assembly. The tie rod sub-assembly includes the tie rod having a first end and a second end distal to the first end. The tie rod is adapted to be inserted in the second slot of the base component through the first end. The tie rod sub-assembly includes a counter plate formed on the second end and adapted to move the tie rod to lock the connector assembly for connecting and aligning the pair of formwork panels, when the tie rod is received through the second slot of the base component.

In another embodiment of the present disclosure, an alignment clamp sub-assembly for connecting and aligning a pair of formwork panels with each other is disclosed. The alignment clamp sub-assembly includes a base component to be disposed on a joint between a first formwork panel and a second formwork panel. The base component includes a first slot formed on a top surface, and a second slot formed on a front surface and adapted to receive a tie rod in a lateral direction. The alignment clamp sub-assembly includes a wedge adapted to be received in a vertical direction in the first slot. The wedge is inserted to lock the base component on the joint and form the second slot for receiving the tie rod.

To further clarify the advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF FIGURES

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which this invention belongs. The system, methods, and examples provided herein are illustrative only and not intended to be limiting.

For example, the term "some" as used herein may be understood as "none" or "one" or "more than one" or "all." Therefore, the terms "none," "one," "more than one," "more than one, but not all" or "all" would fall under the definition of "some." It should be appreciated by a person skilled in the art that the terminology and structure employed herein is for describing, teaching and illuminating some embodiments and their specific features and elements and therefore, should not be construed to limit, restrict or reduce the spirit and scope of the claims or their equivalents in any way.

For example, any terms used herein such as, "includes," "comprises," "has," "consists," and similar grammatical variants do not specify an exact limitation or restriction, and certainly do not exclude the possible addition of one or more features or elements, unless otherwise stated. Further, such terms must not be taken to exclude the possible removal of one or more of the listed features and elements, unless otherwise stated, for example, by using the limiting language including, but not limited to, "must comprise" or "needs to include."

Whether or not a certain feature or element was limited to being used only once, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language including, but not limited to, "there needs to be one or more . . . " or "one or more element is required."

Unless otherwise defined, all terms and especially any technical and/or scientific terms, used herein may be taken to have the same meaning as commonly understood by a person ordinarily skilled in the art.

Reference is made herein to some "embodiments." It should be understood that an embodiment is an example of a possible implementation of any features and/or elements presented in the attached claims. Some embodiments have been described for the purpose of explaining one or more of the potential ways in which the specific features and/or elements of the attached claims fulfil the requirements of uniqueness, utility, and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or other variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or in the context of more than one embodiment, or in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not necessarily be taken as limiting factors to the attached claims. The attached claims and their legal equivalents can be realized in the context of embodiments other than the ones used as illustrative examples in the description below.

Embodiments of the present invention will be described below in detail with reference to the accompanying drawings.

For the sake of clarity, the first digit of a reference numeral of each component of the present disclosure is indicative of the Figure number, in which the corresponding component is shown. For example, reference numerals starting with digit "1" are shown at least in FIG. 1. Similarly, reference numerals starting with digit "2" are shown at least in FIG. 2.

Figure 1:
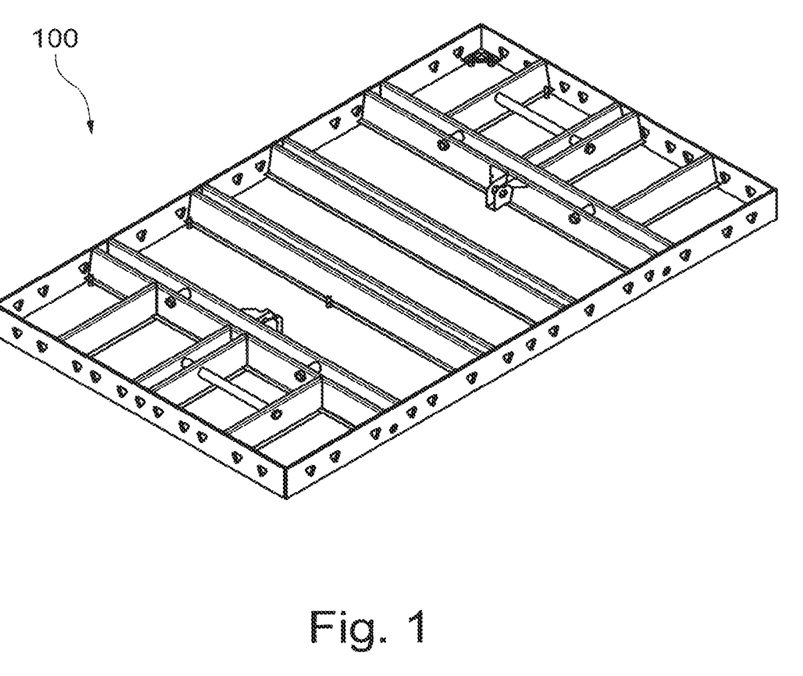
FIG. 1 illustrates a perspective view of a frame of a panel, according to an embodiment of the present disclosure.
Figure 2A:
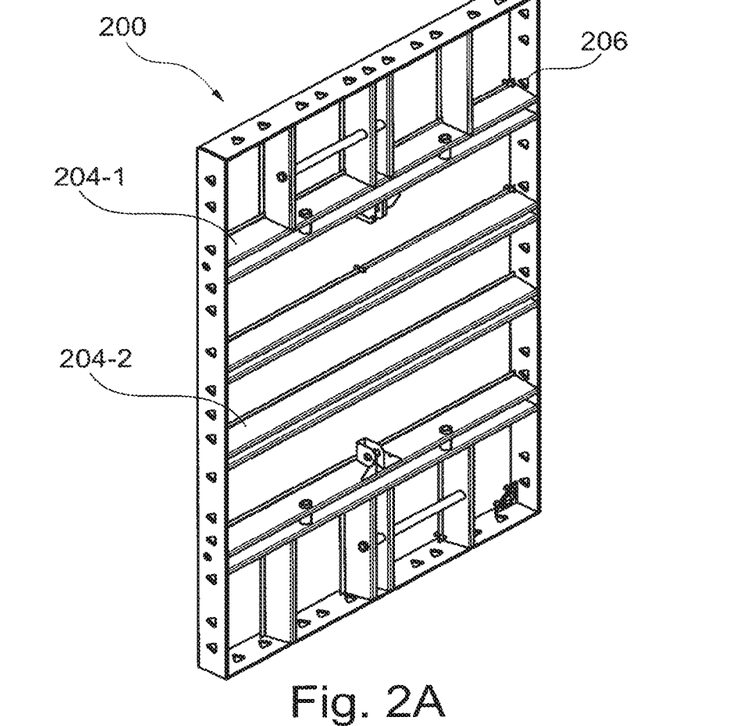
FIG. 2A illustrates a perspective back view of the panel, according to an embodiment of the present disclosure.
Figure 2B:
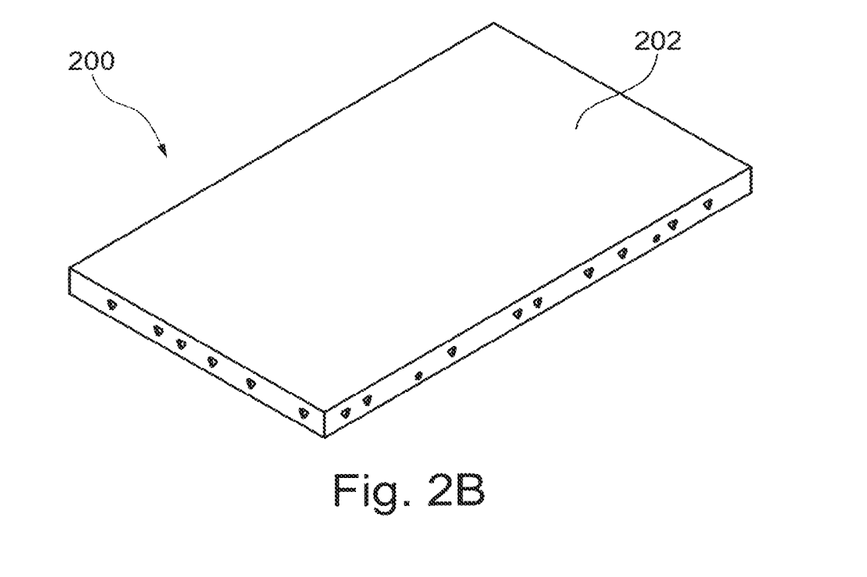
FIG. 2B illustrates a perspective front view of the panel, according to an embodiment of the present disclosure.

FIG. 1 illustrates a perspective view of a frame 100 of a panel, according to an embodiment of the present disclosure. FIG. 2A illustrates a perspective back view of the panel 200, according to an embodiment of the present disclosure. FIG. 2B illustrates a perspective front view of the panel 200, according to an embodiment of the present disclosure. FIG. 2A and FIG. 2B may hereinafter collectively be referred to as FIG. 2. In order to avoid duplicity of information, FIG. 1 and FIG. 2 are explained in conjunction with each other. In an embodiment, the panel 200 may be adapted to be used for construction of structures, such as walls and columns.

Although the present disclosure is explained with respect to application of the panel 200 in the field of construction, the application of the panel 200 should not be construed to be limited to the construction industry only. In fact, the panel 200 can be used in any other application, without departing from the scope of the present disclosure.

In an embodiment, the panel 200 may include, but is not limited to, the frame 100 and a flat portion 202 fixed to the frame 100. The flat portion 202 may come in contact with concrete or any other variant during the construction of the structure. Therefore, the shape or profile of the flat portion 202 may depend on the profile of the structure to be formed. In an embodiment, the flat portion 202 may be formed of at least one of composite ply-board, Birch ply-board, a polypropylene board, and local ply-board. In an embodiment, the flat portion 202 may interchangeably be referred to as form-lining, without departing from the scope of the present disclosure. In an example, the flat portion 202 may have a thickness of 12-13 mm. Further, the flat portion 202 may be conveniently replaced at the construction site.

Further, the frame 100 may be formed of high-grade steel. In an embodiment, the frame 100 may include at least one anchor strut 204. In the illustrated embodiment, the frame 100 includes a pair of anchor struts 204, individually referred to as 204-1 and 204-2. Each anchor strut 204 may have a plurality of slots 302 for accommodating mounting of connector assemblies to connect multiple frames. For example, the slots 302 may be adapted to connect the panels opposite to each other through tie rods. The anchor struts 204 may also have edge stiffening for extra robustness.

Further, the frame 100 may also include a plurality of slots 206 for accommodating one or more connector assemblies. Constructional and operational details of the connector assemblies are explained in detail in the description of subsequent Figures.

Figure 3A:
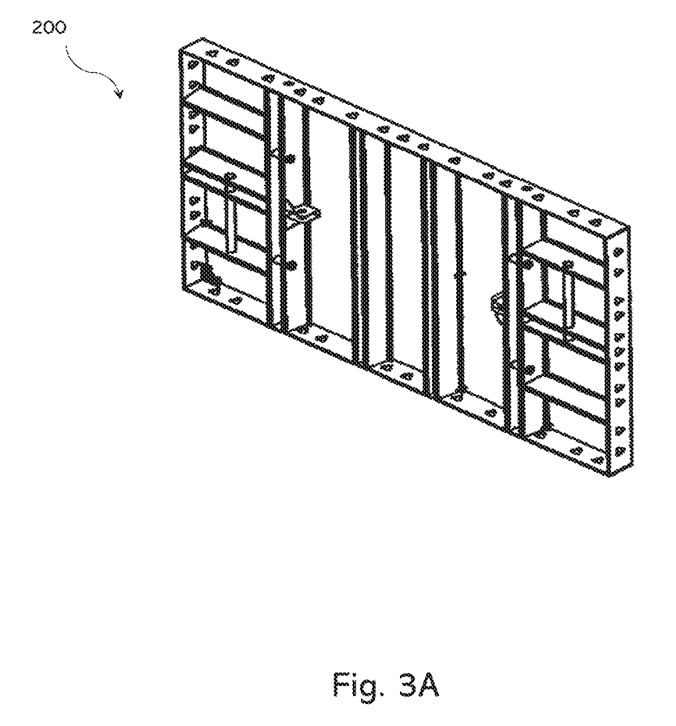
FIG. 3A illustrates another perspective back view of the panel, according to an embodiment of the present disclosure.
Figure 3B:
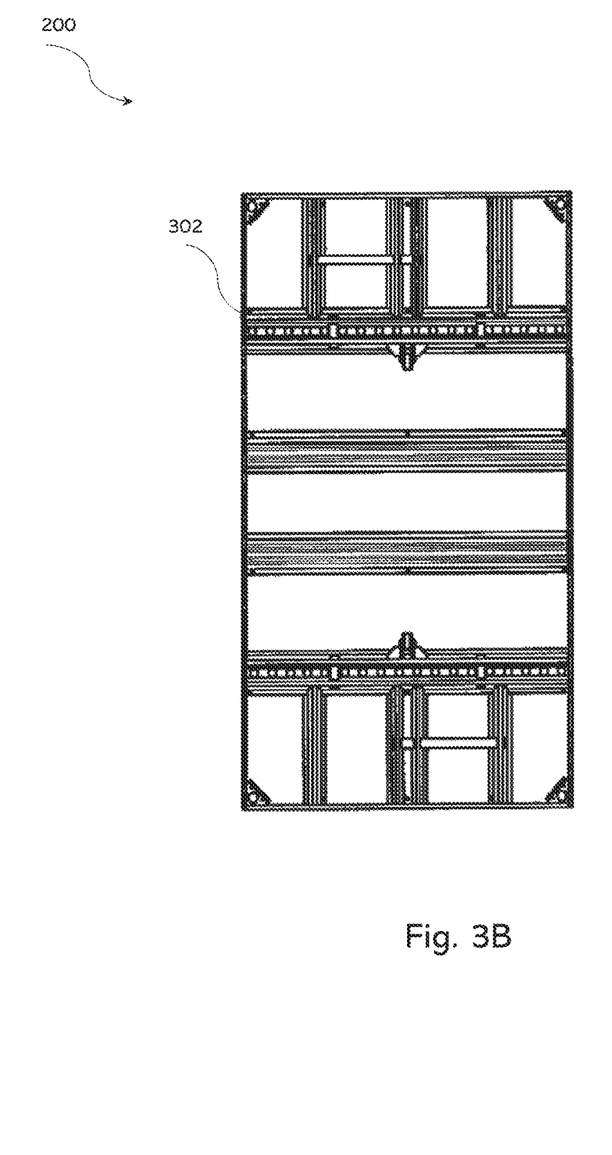
FIG. 3B illustrates a back view of the panel, according to an embodiment of the present disclosure.
Figure 3C:
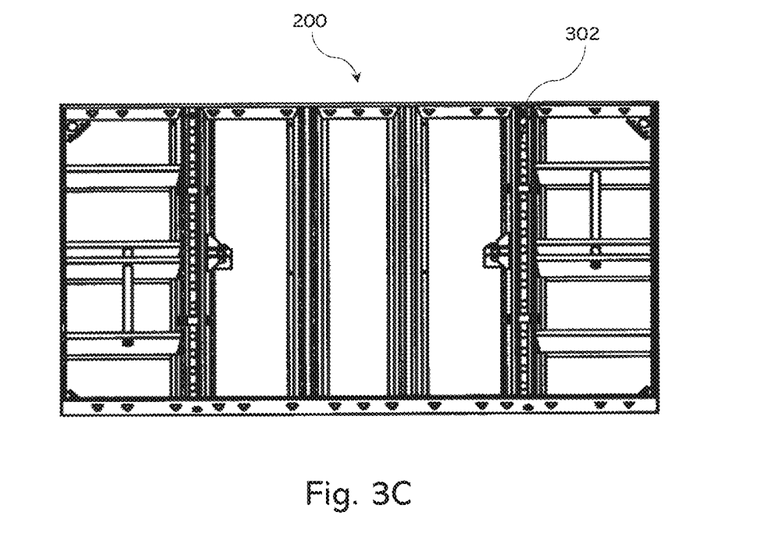
FIG. 3C illustrates another perspective back view of the panel, according to an embodiment of the present disclosure.

FIG. 3A illustrates another perspective back view of the panel 200, according to an embodiment of the present disclosure. FIG. 3B illustrates a back view of the panel 200, according to an embodiment of the present disclosure. FIG. 3C illustrates another perspective back view of the panel 200, according to an embodiment of the present disclosure. FIG. 3A, FIG. 3B, and FIG. 3C may hereinafter collectively be referred to as FIG. 3.

Figure 4:
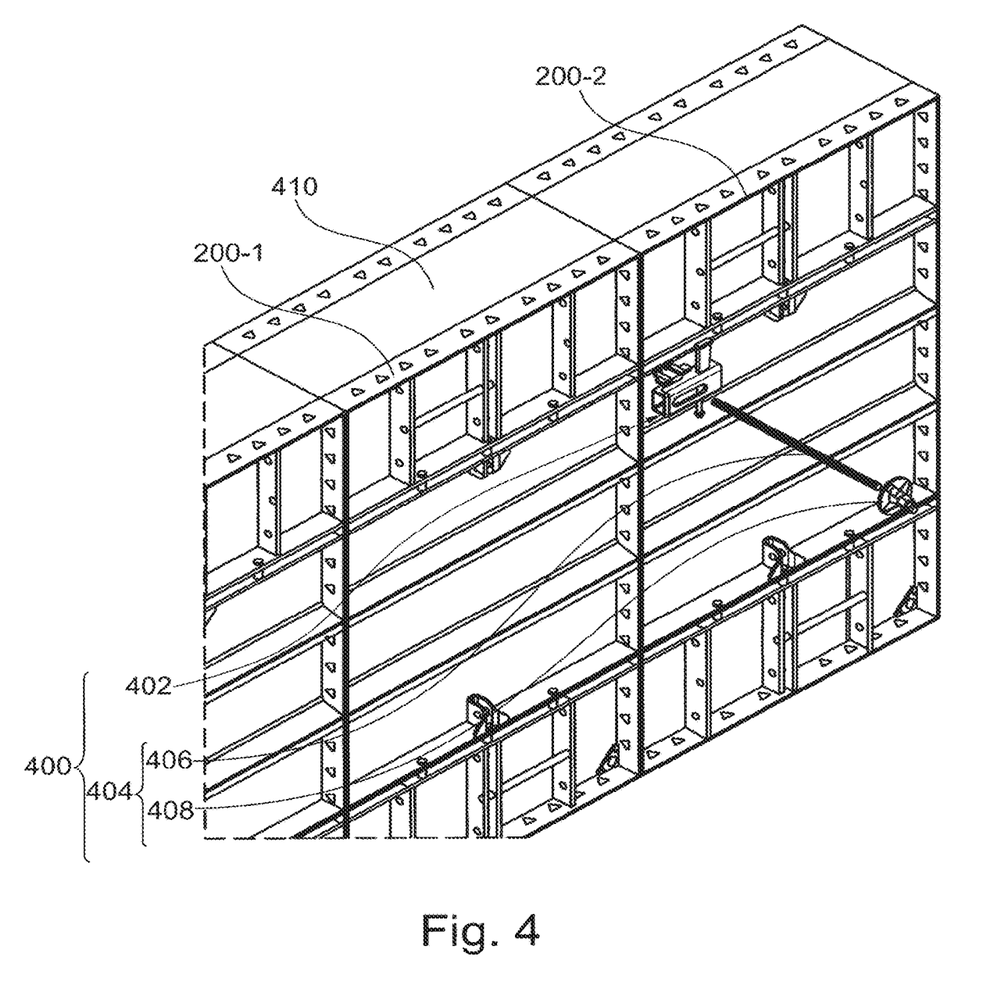
FIG. 4 illustrates a perspective partial view of a pair of panels inter-connected by a connector assembly, according to an embodiment of the present disclosure.

FIG. 4 illustrates a perspective partial view of a pair of panels 200 inter-connected by a connector assembly 400, according to an embodiment of the present disclosure. In the illustrated embodiment, a pair of panels 200 is shown in an assembled state having concrete 410 in between. In an embodiment, the pair of panels 200 may individually be referred to as a first formwork panel 200-1 and a second formwork panel 200-2. The connector assembly 400 may be adapted to connect as well as align the pair of panels 200 with each other.

In an embodiment, the connector assembly 400 may include, but is not limited to, an alignment clamp sub-assembly 402 and a tie rod sub-assembly 404 adapted to be inserted in the alignment clamp sub-assembly 402. In an embodiment, the connector assembly 400 may interchangeably be referred to as an alignment clamp and tie rod connector assembly 400, without departing from the scope of the present disclosure. The alignment clamp sub-assembly 402 may be adapted to be mounted on a joint formed between the first formwork panel 200-1 and the second formwork panel 200-2. The tie rod sub-assembly 404 may then be disposed on the alignment clamp sub-assembly 402.

Figure 5A:
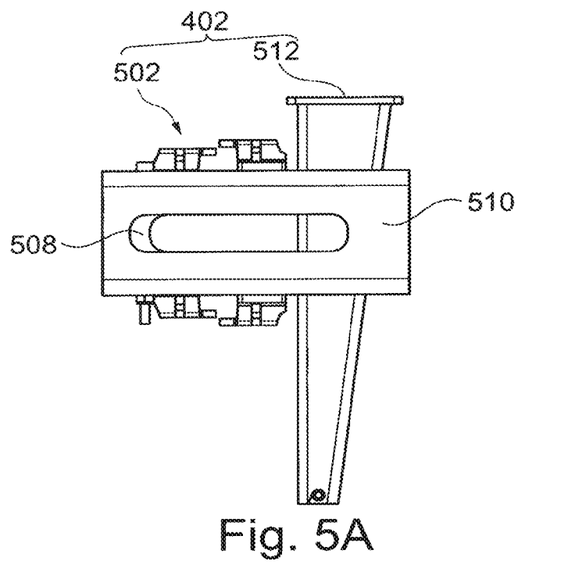
FIG. 5A illustrates a front view of an alignment clamp sub-assembly of the connector assembly, according to an embodiment of the present disclosure.
Figure 5B:
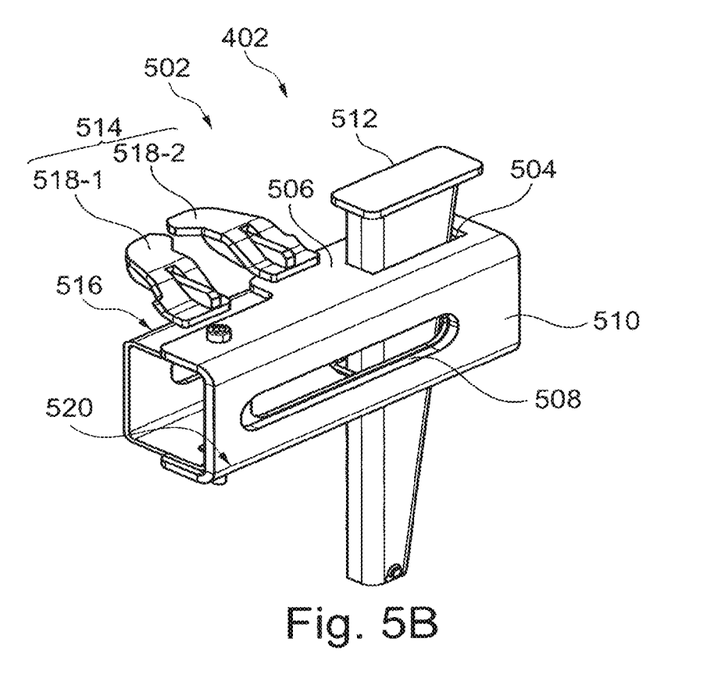
FIG. 5B illustrates a perspective view of the alignment clamp sub-assembly, according to an embodiment of the present disclosure.

FIG. 5A illustrates a front view of the alignment clamp sub-assembly 402, according to an embodiment of the present disclosure. FIG. 5B illustrates a perspective view of the alignment clamp sub-assembly 402, according to an embodiment of the present disclosure. FIG. 5A and FIG. 5B may hereinafter collectively be referred to as FIG. 5.

Referring to FIG. 4 and FIG. 5, the alignment clamp sub-assembly 402 may include, but is not limited to, a base component 502 to be disposed on the joint between the first formwork panel 200-1 and the second formwork panel 200-2. The base component 502 may include, but is not limited to, a first slot 504 formed on a top surface 506, and a second slot 508 formed on a front surface 510. The second slot 508 may be adapted to receive a tie rod 406 of the tie rod sub-assembly 404 in a lateral direction. The alignment clamp sub-assembly 402 may also include a wedge 512 adapted to be received in a vertical direction in the first slot 504. In an embodiment, the alignment clamp sub-assembly 402 may be adapted to include a spring (not shown) disposed in the base component 502. The spring may be adapted to hold the wedge 512 in the first slot 504.

In an embodiment, the wedge 512 may be inserted to lock the base component 502 on the joint and form the second slot 508 for receiving the tie rod 406. In an embodiment, the second slot 508 may be said to be receiving the tie rod sub-assembly 404.

In an embodiment, the alignment clamp sub-assembly 402 may also include a claw-shaped portion 514 formed on the base component 502. The claw-shaped portion 514 may be adapted to engage the base component 502 on the joint for mounting of the connector assembly 400 on the joint.

In an embodiment, the alignment clamp sub-assembly 402 may also include a first part 516 adapted to be disposed adjacent to the joint. The first part 516 may include a first arm 518-1. Further, the alignment clamp sub-assembly 402 may include a second part 520 coupled with the first part 516. The second part 520 may be coupled with the first part 516 such that the second part 520 is adapted to be partially sliding over the first part 516. The second part 520 may include a second arm 518-2. In an embodiment, the alignment clamp sub-assembly 402 may include a supporting structure formed on each arm 518. In an embodiment, each arm 518 may individually be referred to as 518-1 and 518-2.

Figure 6:
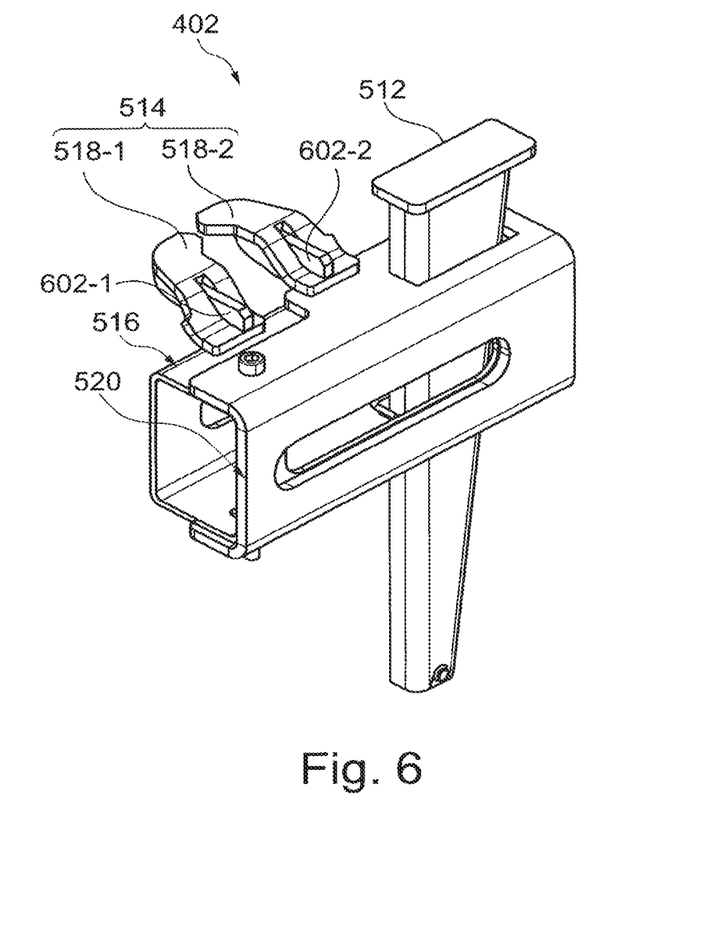
FIG. 6 illustrates a perspective of an alignment clamp sub-assembly of the connector assembly, according to another embodiment of the present disclosure.

FIG. 6 illustrates a perspective view of the alignment clamp sub-assembly 402 having the supporting structure 602 on the arms 518, according to another embodiment of the present disclosure. As shown, the alignment clamp sub-assembly 402 includes a supporting structure 602-1 on the arm 518-1 and a supporting structure 602-2 on the arm 518-2. The supporting structures 602 may be adapted to guide the arms 518 when connecting the first formwork panel 200-1 with the second formwork panel 200-2.

Referring back to FIG. 5, in an embodiment, the second part 520 may be adapted to move with respect to the first part 516 for locking the alignment clamp sub-assembly 402, for example, on the joint. In order to achieve the locking position, the second part 520 may slide on the first part 516 such that the first arm 518-1 and the second arm 518-2 may form the claw-shaped portion 514 to engage with the joint, for example, through the slots 206 of the panels 200. Further, in the locking position, the first part 516 and the second part 520 are aligned to form the first slot 504 and the second slot 508 to receive the wedge 512 and the tie rod 406, respectively. Moreover, in the locking position, the base component 502 may be adapted to be disposed on the joint such that the second slot 508 is aligned with one of the slots 302 of the anchor strut 204 of one of the first formwork panel 200-1 and the second formwork panel 200-2. The alignment is formed to receive the tie rod sub-assembly 404.

Figure 7A:
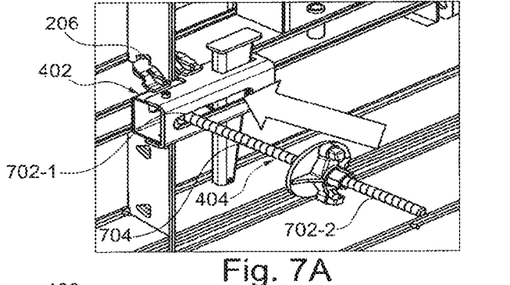
FIGS. 7A, 7B, and 7C illustrate assembly of a tie rod sub-assembly on the alignment clamp sub-assembly to form the connector assembly, according to an embodiment of the present disclosure.
Figure 7B:
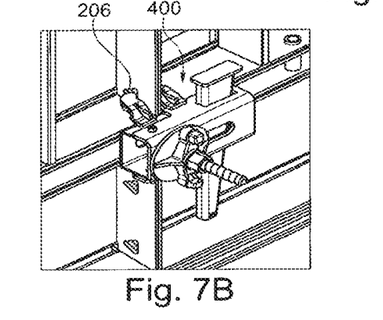
Figure 7C:
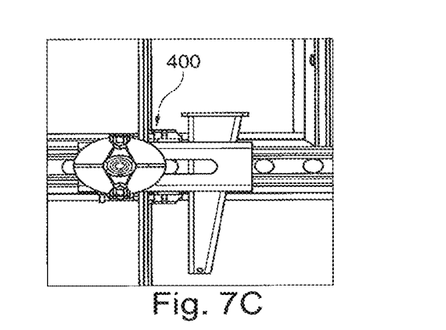

Referring back to FIG. 4, the tie rod sub-assembly 404 may include, but is not limited to, the tie rod 406 and a counter plate 408. In an embodiment, the counter plate 408 may be a wing-nut counter plate 408. FIG. 7A, FIG. 7B, and FIG. 7C illustrate assembly of the tie rod sub-assembly 404 on the alignment clamp sub-assembly 402 to form the connector assembly 400, according to an embodiment of the present disclosure. As mentioned earlier, each of the panels 200 includes the slots 206. Both the panels 200-1 and 200-2 may be put together such that the corresponding slots 206 are aligned with each other.

As illustrated in FIG. 7A, the aligned slots 206 may be adapted to accommodate the claw-shaped portion 514 of the alignment clamp sub-assembly 402 for mounting the alignment clamp sub-assembly 402 on the joint of the panels 200. The base component 502 may be mounted on the panels 200 such that the second slot 508 is in alignment with the slot 302 on the anchor strut 204 of the frame 100. Once the base component 502 is mounted on the panels 200, the wedge 512 may then be inserted in the base component 502. Subsequently, the tie rod 406 may be inserted in the second slot 508 of the base component 502. In particular, the tie rod 406 may insert through the second slot 508 of the base component 502 and the slot 302 formed on the anchor strut 204 for the assembly.

In an embodiment, the tie rod 406 may include a first end 702-1 and a second end 702-2 distal to the first end 702-1. In an embodiment, the tie rod 406 may be inserted through the first end 702-1. The tie rod 406 may include threads 704 along the length. The threads 704 may be adapted to engage with the slot 302 formed in the panel 200 through the second slot 508 of the base component 502.

Further, as illustrated in FIG. 7B, after the insertion, i.e., when the tie rod 406 is received through the second slot 508 of the base component 502, the counter plate 408 formed on the second end 702-2 of the tie rod 406 may be adapted to move the tie rod 406. The movement of the tie rod 406 may lock the connector assembly 400 and therefore, connect and align the first formwork panel 200-1 with the second formwork panel 200-2.

Figure 8:
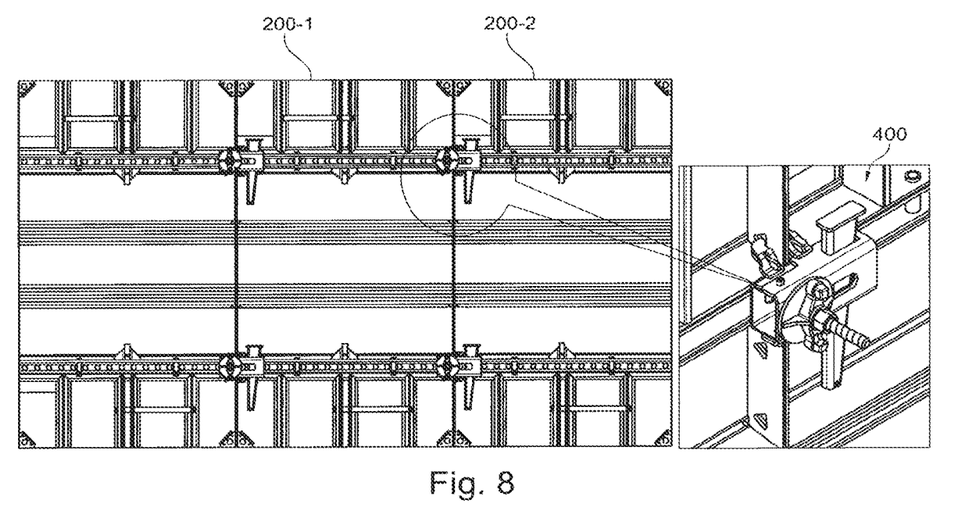
FIG. 8 illustrates a front view of a number of panels inter-connected through a plurality of connector assemblies, according to an embodiment of the present disclosure.

FIG. 7C illustrates the connector assembly 400 mounted on the panels 200 for connection and alignment of the panels 200. Therefore, the connector assembly 400 accommodates the tie rod 406 at the same location as that of the alignment clamp sub-assembly 402. Also, the connector assembly 400 does not need any external profile or additional component for being mounted on the panels 200. In fact, the connector assembly 400 mounts on the panels 200 by using the slots 206 of the panels 200. Further, FIG. 8 illustrates a front view of a number of panels 200 inter-connected through a plurality of connector assemblies 400, according to an embodiment of the present disclosure. For the sake of brevity, constructional and operational features of the present disclosure that are already explained in the description of previous figures are not explained in FIG. 8.

As would be gathered, the connector assembly 400 of the present disclosure offer a comprehensive approach for construction of the structures, such as walls and columns. Firstly, owing to the use of high-grade steel for the frame 100 and corresponding supporting profiles, the panels 200 so formed are robust. Further, the form-lining or the flat portion 202 of the panel 200 ensures best form finish of the structure formed.

Considering the convenience of assembling and disassembling the panels 200, time taken for forming the structure is also significantly reduced. In addition, the panel 200 can be connected to other panels 200 in any alignment. This would ensure flexibility in terms of applications of the panels 200. Therefore, the panel 200 and the connector assembly 400 of the present disclosure are safe, risk-free, flexible in implementation, cost-effective, convenient, and has a wide range of applications.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A connector assembly for connecting and aligning a pair of formwork panels with each other, the connector assembly comprising:
    an alignment clamp sub-assembly adapted to be mounted on a joint between a first formwork panel and a second formwork panel, the alignment clamp sub-assembly comprising:
        a base component to be disposed on the joint, wherein the alignment clamp sub-assembly comprising a claw-shaped portion formed on the base component and adapted to engage the base component on the joint, and wherein the base component comprising:
            a first slot adapted to receive a wedge in a vertical direction;
            a second slot adapted to receive a tie rod in a lateral direction;
            a first part adapted to be disposed adjacent to the joint formed by the pair of formwork panels, the first part comprising a first arm; and
            a second part coupled with the first part such that the second part is adapted to slide over the first part, the second part comprising a second arm, wherein the second part is adapted to move with respect to the first part for locking the alignment clamp sub-assembly such that;
                the first arm and the second arm form the claw shaped portion to engage with the joint;
                the first slot is formed to receive the wedge; and
                the second slot is formed to receive the tic rod; and
            a tie rod sub-assembly adapted to be disposed on the alignment clamp sub-assembly, the tie rod sub-assembly comprising:
                the tie rod having a first end and a second end distal to the first end, wherein the tie rod is adapted to be inserted in the second slot of the base component through the first end; and
        a counter plate formed on the second end and adapted to move the tie rod to lock the connector assembly for connecting and aligning the pair of formwork panels, when the tie rod is received through the second slot of the base component.

2. The connector assembly as claimed in claim 1, comprising the tie rod having threads along the length and adapted to engage with a slot formed in one of the first formwork panel and the second formwork panel through the second slotof the base component, wherein the slot and the second slot are aligned with each other.

3. An alignment clamp sub-assembly for connecting and aligning a pair of formwork panels with each other, the alignment clamp sub-assembly comprising:
    a base component to be disposed on a joint between a first formwork panel and a second formwork panel;
    a claw-shaped portion formed on the base component and adapted to engage the base component with the joint, wherein the base component comprising:
        a first slot formed on a top surface; and a second slot formed on a front surface -and adapted to receive a tie rod in a lateral direction;
        a wedge adapted to be received in a vertical direction in the first slot, wherein the wedge is inserted to lock the base component on the joint and form the second slot for receiving the tie rod;
        a first part adapted to be disposed adjacent to the joint formed by the pair of formwork panels, the first part comprising a first arm; and a second part coupled with the first part such that the second part is adapted to slide over the first part, the second part comprising a second arm, wherein the second part is adapted to move with respect to the first part for locking the alignment clamp sub-assembly such that:
   the first arm and the second arm form the claw shaped portion to engage with the joint;
   the first slot is formed to receive the wedge; and
   the second slot is formed to receive the tie rod.

4. The alignment clamp sub-assembly as claimed in claim 3, wherein the base component is adapted to be disposed on the joint such that the second slot is aligned with a slot of one of the first formwork panel and the second formwork panel for receiving the tie rod.

5. The alignment clamp sub-assembly as claimed in claim 3, comprising a supporting structure formed on each-arms of the claw-shaped portion and adapted to guide the arms when connecting the first formwork panel and the second formwork panel.

\* \* \* \* \*